United States Patent
Cooper et al.

(10) Patent No.: US 9,604,613 B2
(45) Date of Patent: Mar. 28, 2017

(54) BRAKE CONTROLLER

(71) Applicant: Innovative Electronics, Inc., Cedar Rapids, IA (US)

(72) Inventors: Byron D. Cooper, Cedar Rapids, IA (US); Carlton A. Saunders, Jr., Cedar Rapids, IA (US); Anthony M. Tate, Cedar Rapids, IA (US)

(73) Assignee: The Kyle Group, LLC, Cedar Rapids, IA (US)

( * ) Notice: Subject to any disclaimer, the term of this patent is extended or adjusted under 35 U.S.C. 154(b) by 139 days.

(21) Appl. No.: 13/907,124

(22) Filed: May 31, 2013

(65) Prior Publication Data

US 2013/0325209 A1      Dec. 5, 2013

Related U.S. Application Data

(60) Provisional application No. 61/654,188, filed on Jun. 1, 2012.

(51) Int. Cl.
*B60T 7/20* (2006.01)
*B60T 8/17* (2006.01)
*B60T 8/32* (2006.01)

(52) U.S. Cl.
CPC ............... *B60T 8/323* (2013.01); *B60T 7/20* (2013.01); *B60T 8/1708* (2013.01); *B60T 2230/06* (2013.01); *B60W 2300/14* (2013.01)

(58) Field of Classification Search
CPC ........ B60T 8/323; B60T 8/248; B60T 8/1708; B60T 8/1887; B60T 7/20; B60T 7/203; B60T 2230/06; B60R 25/33; B60W 2300/14

USPC .............................. 701/2, 70, 75, 78–79, 81; 340/426.13–426.19, 426.32, 431, 453; 280/480, 504; 254/2 R
See application file for complete search history.

(56) References Cited

U.S. PATENT DOCUMENTS

| | | |
|---|---|---|
| 5,050,937 A | 9/1991 | Eccleston |
| 5,149,176 A | 9/1992 | Eccleston |
| 5,352,028 A | 10/1994 | Eccleston |
| 5,917,423 A | 6/1999 | Duvall |
| 2003/0168908 A1* | 9/2003 | Robinson et al. ............... 303/7 |
| 2004/0113761 A1* | 6/2004 | Borugian ............... B60R 25/04 340/426.1 |
| 2006/0049686 A1* | 3/2006 | Bess ................... B60T 13/66 303/7 |
| 2008/0278314 A1* | 11/2008 | Miller ................... G07C 5/008 340/539.13 |

(Continued)

OTHER PUBLICATIONS

Simplifying Electric Trailer Brake Control, Nov 9, 2009.*

(Continued)

*Primary Examiner* — Abby Lin
(74) *Attorney, Agent, or Firm* — McKee, Voorhees & Sease, PLC (57) ABSTRACT

A braking control system associated with a towed apparatus is provided. The braking control system includes an intelligent control, an accelerometer electrically coupled to the intelligent control, a global positioning receiver electrically coupled to the intelligent control, and a visual indicator operatively coupled to the intelligent control. The braking control system may also include a wireless RF receiver operatively coupled to the intelligent control.

15 Claims, 6 Drawing Sheets

(56) References Cited

U.S. PATENT DOCUMENTS

| | | | |
|---|---|---|---|
| 2010/0076622 A1* | 3/2010 | Dickerhoof et al. | 701/2 |
| 2010/0152920 A1 | 6/2010 | McCann | |
| 2010/0152989 A1 | 6/2010 | Smith et al. | |
| 2010/0262368 A1* | 10/2010 | Kaminski | 701/213 |
| 2012/0078487 A1* | 3/2012 | Light-Holets | 701/102 |
| 2013/0124059 A1* | 5/2013 | Funder | B60D 1/30 701/70 |

OTHER PUBLICATIONS

"Jurisdiction" synonyms, Thesaurus.com.*
http://www.forconstructionpros.com/product/10081998/innovative-electronics-inc-innovator-brake-control [retrieved from Internet May 30, 2013], 1 page.

* cited by examiner

BRAKE CONTROLLER

CROSS-REFERENCE TO RELATED APPLICATIONS

This application claims priority under 35 U.S.C. §119 to provisional application Ser. No. 61/654,188 filed Jun. 1, 2012, herein incorporated by reference in its entirety.

FIELD

The present disclosure relates to brake controllers for towed vehicles. In particular, the disclosure relates to augmentation control of an electric or magnetic braking system.

BACKGROUND

Presently, a tow or towing vehicle has a mechanical linkage to haul a vehicle trailer equipped with an electric, magnetic, or hydraulic braking system. Typically, a connector is spliced into the towing vehicle's electrical braking system for proper operation. In some examples, an onboard permanently installed dash pot is electrically connected to the electrical system to communicate directly with a brake controller mounted on the vehicle trailer so as to adjust the applied brake force according to the size of the load.

These types of brake controllers may include microprocessors, accelerators, and sway sensors which when properly configured allow for smooth operation. Unfortunately, calibration may be a lengthy process. Even where such systems include diagnostic features, the process of diagnosing and then calibrating or adjusting is a lengthy and inconvenient process. Moreover, the calibration features may limit the brake controller mounting positions and require the driver or operator of the vehicle trailer to externally manually adjust dials or other controls in order to obtain the desired results.

What is needed is an improved control of braking systems.

SUMMARY

Therefore, it is a primary object, feature, or advantage of the present disclosure to improve over the state of the art.

It is a further object, feature, or advantage of the present disclosure to provide a braking system which allows for automatic calibration.

It is a still further object, feature, or advantage of the present disclosure to provide a braking system which allows for operator override of braking parameters.

One or more of these and/or other objects, features, or advantages of the present disclosure will become apparent from the specification and claims that follow. No single embodiment need exhibit all of these objects, features, or advantages.

According to one aspect of the present disclosure, an electronic control system for controlling braking is provided. The system includes a keyfob device having an RF transmitter and a braking control system associated with a towed apparatus, the braking control system including an intelligent control, an accelerometer electrically connected to the intelligent control, a global positioning receiver electrically connected to the intelligent control, a visual indicator operatively connected to the intelligent control; and a wireless RF receiver operatively connected to the intelligent control. The keyfob device is configured to communicate brake force control settings to the braking control device to control brake force of the towed apparatus.

According to another aspect of the present disclosure, a braking control system associated with a towed apparatus is provided, the braking control system includes an intelligent control, an accelerometer electrically connected to the intelligent control, a global positioning receiver electrically connected to the intelligent control, and a visual indicator operatively connected to the intelligent control.

DETAILED DESCRIPTION

Generally, the present disclosure describes an example of a brake control system for controlling the operation of brakes on a towed vehicle (for example, a trailer, a vehicle in tow, etc.). In on example, a brake controller is mounted to the towed vehicle, for example, to the frame or tongue of the towed vehicle. The brake controller includes one or more sensors and is also electrically coupled to the trailer braking system. Based on conditions sensed (for example, the application of the towing vehicle brakes, accelerometer outputs, user input, etc.) by the brake controller, the brake controller activates the towed vehicles brakes for an optimal duration and with an optimal force. The brake controller also can receive wireless user input for various purposes, such as brake control override, testing, brake adjustment, calibration, etc.

Figure 1:
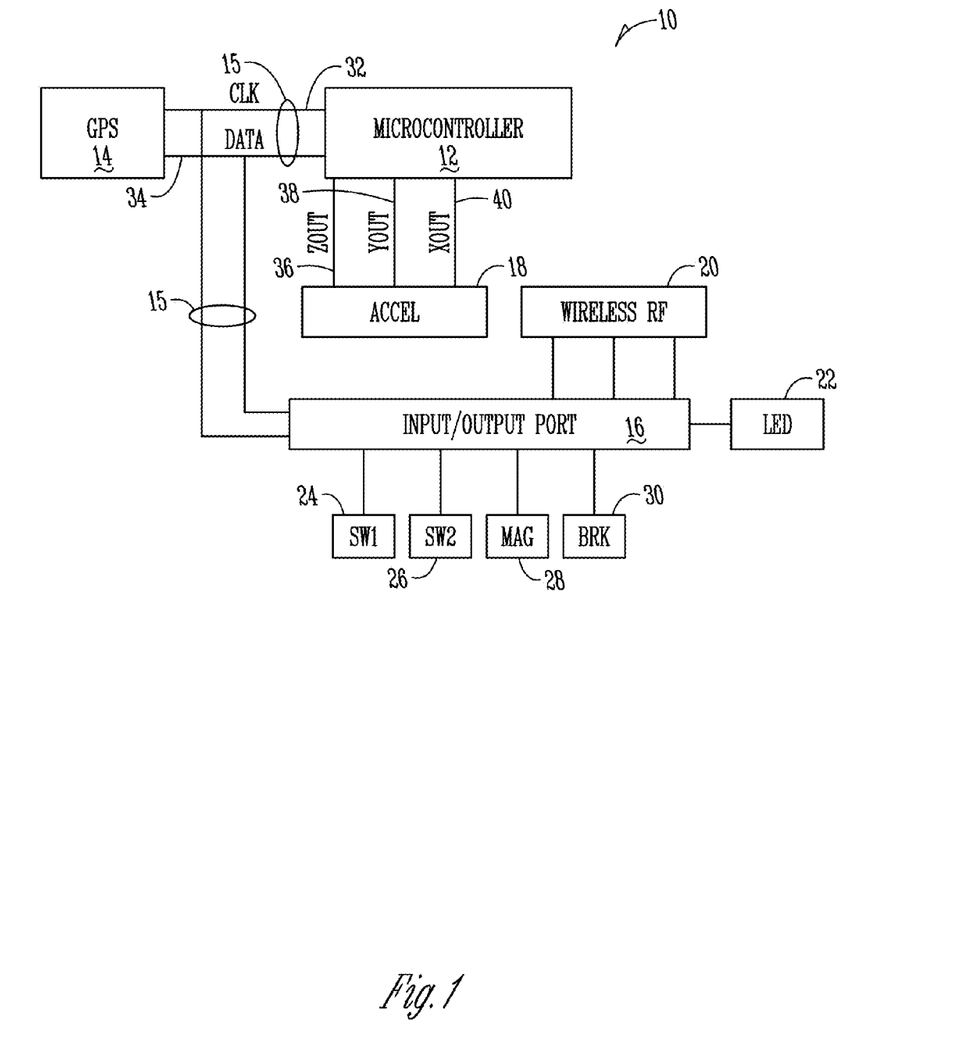
FIG. 1 is a block diagram of one embodiment of a control system.

FIG. 1 is a block diagram illustrating one embodiment of a control system 10 used with a braking system of the present disclosure. The control system 10 includes an intelligent control such as a microcontroller (MCU) 12 (i.e., a processor, CPU, etc.). In the example shown, the microcontroller 12 is electrically coupled to a location receiver such as a Global Positioning System (GPS) receiver 14 via a bus 15. The GPS receiver 14 may be used for any desire purpose. For example, since laws and regulations regarding towed vehicles can vary over different jurisdictions, it may be desired to control the operation of the control system based on a jurisdiction. In one example, a brake control system is designed to operate in compliance to laws or regulations on a specific jurisdiction(s). Since the operation of the control system may not comply with the laws or regulations of another jurisdiction, the system can be designed to be disabled when the GPS receiver determines that the system is outside of a designated operating range (e.g., in another jurisdiction). In another example, the system can be programmed to operate under the rules of multiple jurisdictions. In this example, the operation of the system is altered to comply with the rules of the jurisdiction in which the system is currently located. Other examples of uses of the GPS receiver are provided below.

The bus 15 can be comprised of any desired bus, such as a bus using I2C protocol. Other protocol may also be used. In other examples, the various components of the system 10 can be independently coupled to the microcontroller 12. In the example shown, the bus 15 includes a clock line 32 and a data line 34.

The microcontroller 12 is also electrically coupled to an input/output (I/O) port 16 (described below) via the bus 15. The microcontroller 12 is also electrically connected to a three axis accelerometer 18. Data lines such as ZOUT 36 (for a z-axis position), YOUT 38 (for a y-axis position), and XOUT 40 (for an x-axis position) are also shown. The accelerometer 18 provides information to the microcontroller 12 relating to the towed vehicle's acceleration in three dimensions. For example, when the tow vehicle (and thus also the towed vehicle) accelerates, the accelerometer 18 will detect the acceleration and provide data to the microcontroller 12. Similarly, when the tow vehicle decelerates (brakes), the accelerometer 18 will detect the deceleration (and rate of deceleration) and provide data to the microcontroller 12.

The I/O port 16 is coupled to various inputs and outputs, and communicates the states of the inputs and outputs to the microcontroller 12 over the bus 15. The I/O port 16 may also communicate with the microcontroller in various other ways. In another example, one or more of the inputs and outputs coupled to the I/O port 16 can be coupled directly to the microcontroller 12. In the example shown in FIG. 1, the I/O port 16 is electrically coupled to a wireless radio-frequency (RF) receiver 20. The I/O port 16 is also electrically coupled to an indicator or display such as a light emitting diode (LED) 22.

The I/O port 16 is also electrically coupled to a plurality of inputs, including a first switch 24, a second switch 26, a magnetic pulse control 28, and a brake control 30. In the example shown, the first switch 24 is an operator switch and the second switch 26 is a roadside switch. The operator switch 24 may be used by an operator to communicate with the microcontroller 12 in order to set the desired amount of applied brake force. A user may wish to adjust the amount of applied brake force based on various factors, such as the weight of the loan on the towed vehicle. The LED 22 may be used to indicate changes in the amount of applied brake force. For example, different numbers of LED pulses or flashes may represent different amounts of applied brake force. Thus, a single flash can indicate a gain setting of 10 percent, two flashes can indicate a gain setting of 20 percent, and each additional flash indicating a gain setting of an additional 10 percent. Thus, ten flashes can indicate a gain setting of 100 percent. Twelve flashes may be used to indicate an inoperative condition. The present disclosure contemplates that gain settings and inoperative conditions may otherwise be conveyed such as through use of multiple LEDs, a LCD display, or otherwise.

The inoperative condition allows the brake controller to be electrically connected in parallel with additional brake controllers but without requiring the brake controller to be operative.

The second switch 26 may be used as a roadside switch by a person in an official capacity to test the brake controller, such as during a roadside inspection, or to be otherwise used to test operation of the control system.

Figure 2:
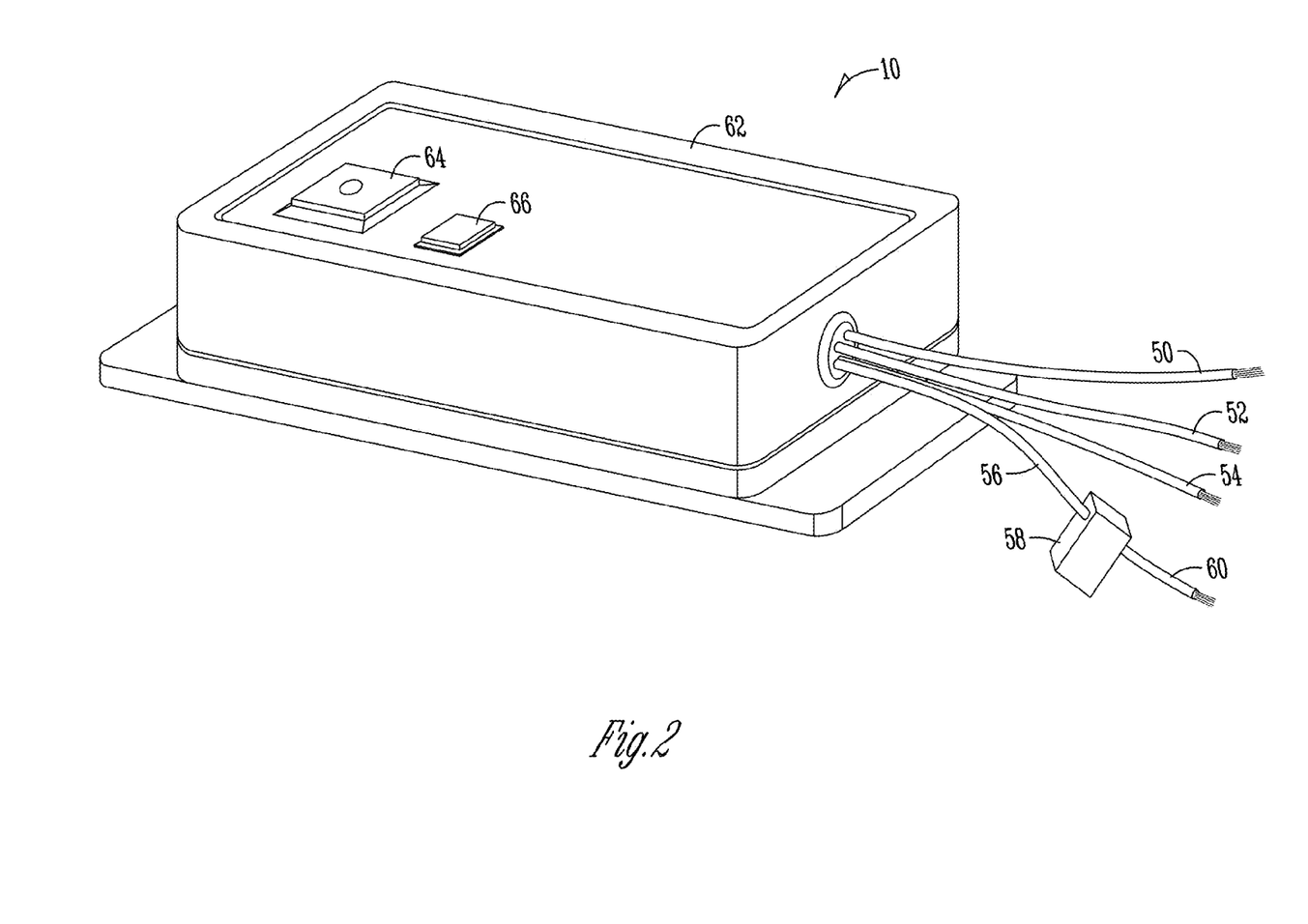
FIG. 2 is a perspective view of a brake controller within a housing.

FIG. 2 illustrates a perspective view of the brake control system 10 used with a housing 62, which can be mounted to a towed vehicle. In general, the brake controller is an electronic current sourcing control device that supplies an appropriate amount of applied current to activate the magnetic, electric, or hydraulic brakes of the towed vehicle to which it is mounted. The amount of applied current is determined automatically by an intelligent control which may be a microcontroller (such as microcontroller 12, described above) programmed to do so. In the example shown in FIG. 2, the components of the system shown in FIG. 1 are disposed within the housing 62.

In the example shown in FIG. 2, an override switch 64 and a down-switch 66 are shown. The override switch 64 may be used to override automatic control, similar to switch 26, described above. The down-switch 66 may be used to decrease (or increase) an amount of braking force, similar to switch 24, described above. Extending from the housing 62 are four wires (although as few as two wires may be used). One or more of the wires may be used to provide inputs to the system (e.g., inputs 28 and 30 shown in FIG. 1). Wire 56 is of an appropriate gauge to handle large currents and a fuse block 58 is attached to conductor wire 60 which has the same gauge as wire 56. In one example, wire 60 is electrically coupled to a voltage source, such as a trailer battery, and/or a tow vehicle battery. The wire 50 is for the tail light brake, wire 54 is the conductor which is spliced into the magnetic brake, and wire 52 is coupled to ground. In one example, where the housing 62 is mounted to the trailer, ground can be provided through the trailer frame. The brake controller 10 receives the brake signal from the tail light when the operator depresses the brake (i.e., the input 30 shown in FIG. 1).

Figure 3:
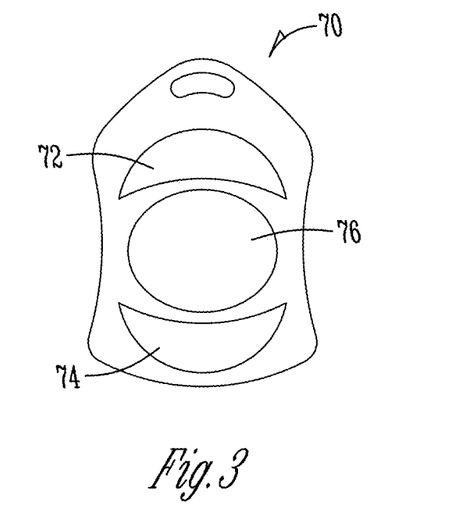
FIG. 3 illustrates one view of an RF keyfob.

FIG. 3 illustrates a keyfob device 70 which includes an up-switch 72, a down-switch 74, and an override switch 76. The up-switch 72 may be used to increase an amount of brake force. The down-switch 74 may be used to decrease an amount of brake force, and the override switch 76 may be used to over-ride automatic control.

The present disclosure allows the operator to override the settings determined by the intelligent control using the algorithm. This override can be performed in various ways. One way that the operator can override automatically adjusted parameter settings is by communicating override information to a wireless Radio Frequency ("RF") receiver (for example, the RF receiver 20 shown in FIG. 1) using the keyfob device. Alternatively, an operator may use physical controls such as switches (for example, as shown in FIG. 2) to override the settings determined by the intelligent control.

Figure 4:
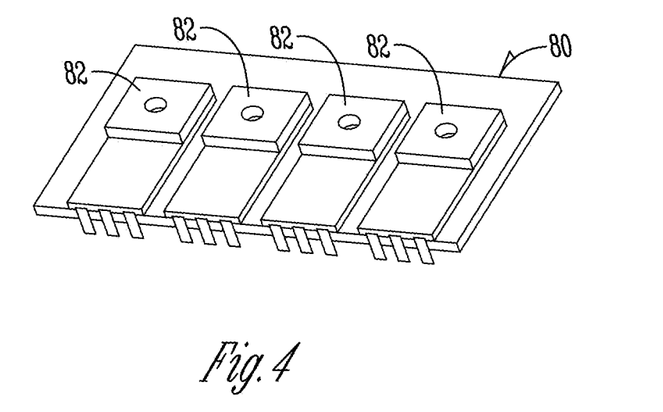
FIG. 4 illustrates circuitry which may be used to control the magnetics.

FIG. 4 illustrates a circuit board 80 which may be a part of the input/output port and includes a plurality of MOSFETs 82. The MOSFETs 82 may be operatively connected to the microcontroller and used to control the magnetics by applying a current to the brakes, although the present disclosure contemplates that other types of devices may be used. In addition, optical couplers may be used or other circuitry so that the microcontroller can control the amount of time that a tow trailer or carriage apparatus has brakes engaged and by how much.

Figure 5:
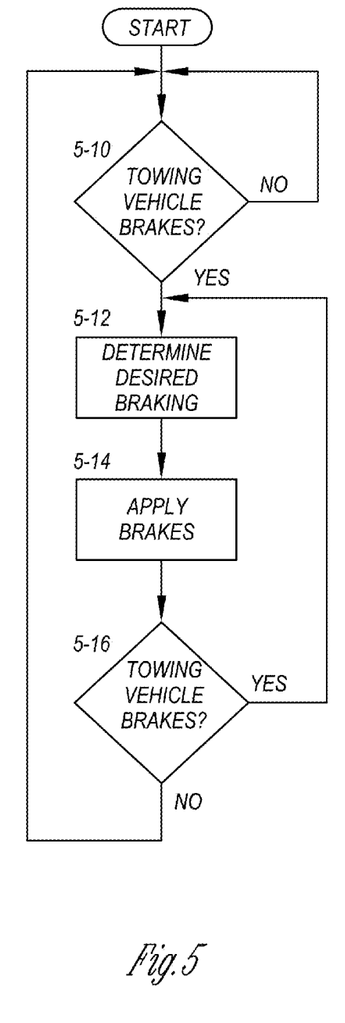
FIG. 5 is a flowchart illustrating one example of the operation of a brake control system.

FIG. 5 is a flowchart illustrating one example of the operation of a brake control system as described above. Generally, one purpose of a braking system for a towed vehicle is to apply brakes to the towed vehicle when the operator of the tow vehicle applies the tow vehicle brakes. At step 5-10, the system waits for the tow vehicle brakes to be applied. If it is determined that the tow vehicle brakes have been applied, the process proceeds to step 5-12, where the intelligent control (e.g., microcontroller 12 in FIG. 1) determines appropriate brake controls for the towed vehicle.

In one example, the intelligent control can use any desired factors to determine an appropriate amount of braking including, for example, accelerometer readings (e.g., as received from accelerometer 18 in FIG. 1) and pre-defined brake settings (e.g., as set by a user using switch 24 in FIG. 1 or the keyfob of FIG. 3). Other inputs may also be used. In some jurisdictions, laws or regulations require that the brakes of a towed vehicle must be applied when the brakes of the towing vehicle are applied. So, in one example, the system will apply brakes even when the accelerometers (or other inputs) determine that the towed vehicle is not decelerating. At step 5-14, the towed vehicle brakes are applied in the amount determined by the intelligent control. As long as the tow vehicle brakes are being applied (the "yes" branch of step 5-16), the brake control system continues to determine an appropriate amount of braking (step 5-12) and to apply the brakes (step 5-16) of the towed vehicle. Once the tow vehicle brakes are no longer being applied (the "no" branch of step 5-16), the brake control system waits for the tow vehicle brakes to be applied again (step 5-10). The example above is merely one example, as the brake control system can operate in any desired manner.

In one example, a brake control system, such as the system described above, detects and makes adjustments for trailer sway. Trailer sway occurs when the forces on the trailer cause the trailer to move from side to side behind the tow vehicle. In one example, the brake control system detects sway using accelerometers. In the exemplary system shown in FIG. 1, the microcontroller can detect sway using readings from the accelerometers 18. Upon detecting trailer sway, the intelligent control applies activates the trailer brakes for a desired duration and with a desired force to attempt to reduce or stop the sway.

Figure 6:
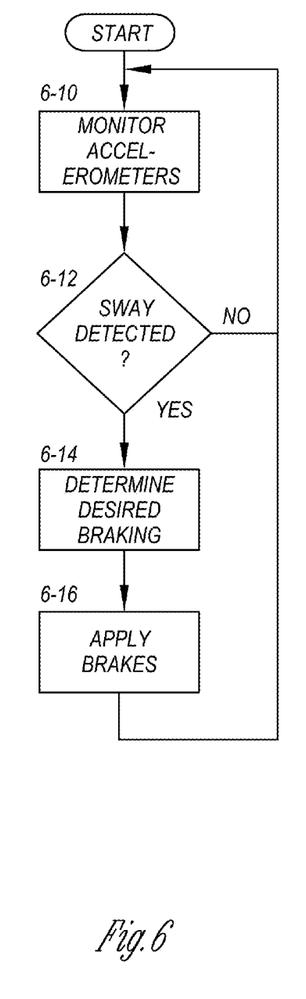
FIG. 6 is a flowchart illustrating one example of the operation of a brake control system having an automatic sway control function.

FIG. 6 is a flowchart illustrating one example of the operation of a brake control system having an automatic sway control function. At step 6-10, the system monitors data from the accelerometers. If the accelerometer output is indicative of trailer sway (the "yes" branch of step 6-12), the process proceeds to step 6-14, where an appropriate amount of braking force is determined. The amount of braking force can be based on various factors such as the severity of the sway, the velocity of the vehicle (via GPS data) the duration of the detected sway, etc. At step 6-14, the trailer brakes are applied, and the process repeats.

Figure 7:
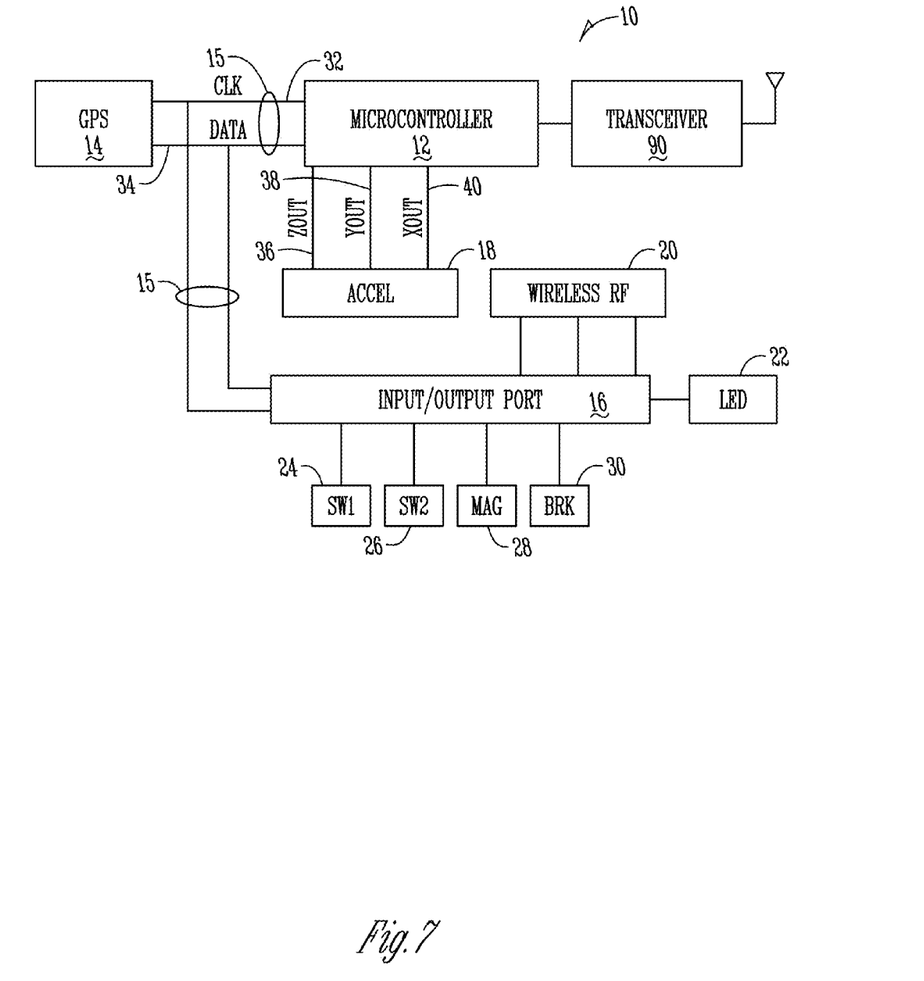
FIG. 7 is a block diagram of one embodiment of a control system.

In some examples, a brake control system can include a wireless transmitter or transceiver to communicate remotely with other devices or systems. FIG. 7 is a block diagram illustrating one embodiment of a control system 10 used with a braking system of the present disclosure. The control system shown in FIG. 7 is similar to the control system shown in FIG. 1, with the addition of transceiver 90 (or a transmitter, if two-way communication is not needed). The existence of a transceiver enables various functions, including providing information to a remote display unit, a remote data collection device, or a tracking service. In one example, the brake control system can also function with a stolen vehicle recovery service. If the towed vehicle is stolen, the vehicle recovery service can communicate with the control system via the transceiver 90. The control system can then transmit information to the service relating to the location of the towed vehicle, as determined by the GPS receiver 14. The location information can be used by law enforcement official to recover the vehicle. In the same manner, a company with a fleet of towed vehicles can track the positions of its vehicles.

Figure 8:
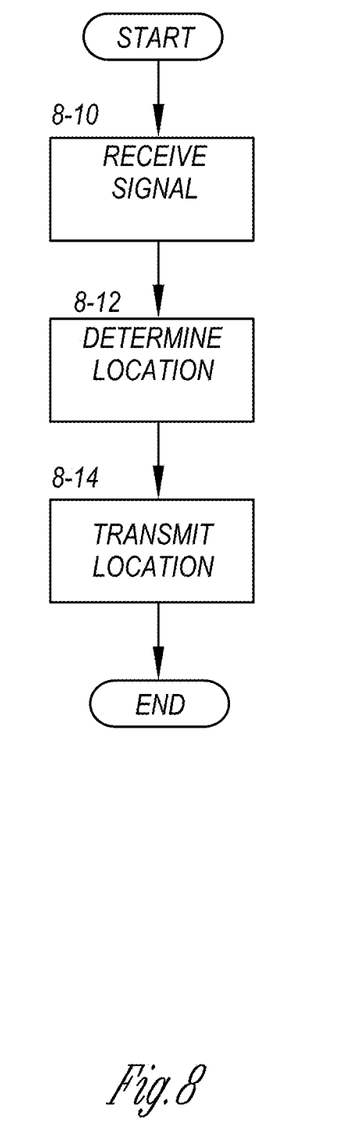
FIG. 8 is a flowchart illustrating one example of the operation of a brake control system used in conjunction with a stolen vehicle recovery system.

FIG. 8 is a flowchart illustrating one example of the operation of a brake control system used in conjunction with a stolen vehicle recovery system. In one example, the user of a towed vehicle notifies (via telephone, email, internet, keyfob button, etc.) the recovery system of the theft of the towed vehicle. The recovery system then sends a signal, which is received by the brake control system (step 8-10). The brake control system determines its location using data from the GPS receiver (step 8-12). The brake control system then transmits location information back to the recovery system (step 8-14). In one example, the brake control system then periodically sends updated location information to the recovery system.

Therefore, an electronic control system for controlling braking has been disclosed. The present disclosure contemplates numerous variations including variations in the number and placement of switches, the algorithms used for electronically controlling braking, the type and placement of indicators used, and other options, variations, and alternatives.

What is claimed is:

1. A trailer brake assembly, comprising:
   a brake controller and a braking system of a trailer towed behind a towing vehicle in a longitudinal direction, the vehicle also having a braking system; and
   the brake controller, comprising:
   a housing mounted on a trailer;
   an intelligent controller mounted within the housing and being electrically coupled to the trailer braking system;
   an accelerometer electrically coupled to the intelligent controller and configured to sense longitudinal deceleration of the towing vehicle and then send data to the intelligent controller, which is configured to automatically activate and deactivate the trailer braking system;
   a battery on the trailer electronically coupled to the intelligent controller so as to provide power to the intelligent controller and;
   wherein the brake controller is free from wired and wireless connection to the braking system of the towing vehicle.

2. The combination of claim 1 wherein the accelerometer is a 3 axis accelerometer to detect trailer sway.

3. The combination of claim 1 further comprising an electrical bus coupled to the intelligent controller.

4. The combination of claim 3 further comprising an input/output port electrically coupled to the bus.

5. The combination of claim 1 further comprising a GPS electrically coupled to the intelligent controller.

6. The combination of claim 1 further comprising a first switch electrically coupled to the intelligent controller to allow an operator to set a desired amount of brake force for the trailer braking system.

7. The combination of claim 6 further comprising a second switch electronically coupled to the intelligent controller to test the brake controller while the trailer is stationary.

8. The combination of claim 7 further comprising a third switch electronically coupled to the intelligent controller to override automatic control of the intelligent controller.

9. The combination of claim 8 further comprising a fourth switch electronically coupled to the intelligent controller to decrease braking force of the trailer braking system.

10. An electronic control system for controlling brakes of a towed vehicle pulled in a longitudinal travel direction by a towing vehicle having a brake system, the control system comprising:
    a microprocessor mounted on the towed vehicle and adapted to be electrically coupled to a power source on the towed vehicle and to the brakes, a sensor configured to sense braking deceleration of the towing vehicle in the longitudinal travel direction and then send a signal to the microprocessor, which is configured to actuate the brakes in response to the signal; and wherein the microprocessor is electrically independent from the towing vehicle.

11. The electronic control system of claim 10 wherein the sensor is an accelerometer.

12. The electronic control system of claim 10 wherein the sensor is a 3-axis accelerometer configured to sense trailer sway and then send a signal to the microprocessor to actuate the brakes.

13. The electronic control system of claim 10 further comprising a GPS operatively connected to the microprocessor.

14. The electronic control system of claim 10 further comprising a plurality of switches operatively connected to the microprocessor configured to control the brakes.

15. The electronic control system of claim 10 wherein the microprocessor is adapted to be powered by a battery on the towed vehicle.

* * * * *